United States Patent [19]

Taylor

[11] Patent Number: 5,715,048
[45] Date of Patent: Feb. 3, 1998

[54] CALIBRATION SYSTEM FOR A PHOTO MULTIPLIER TUBE

[75] Inventor: Walter W. Taylor, Dale City, Va.

[73] Assignee: Dynex Technologies, Inc., Chantilly, Va.

[21] Appl. No.: 561,536

[22] Filed: Nov. 22, 1995

[51] Int. Cl.⁶ .................... G01J 1/10; G01J 1/12
[52] U.S. Cl. ........................... 356/229; 356/230
[58] Field of Search ........................ 356/228, 244,
356/246, 440, 435, 230; 250/361; 422/52,
82.05, 82.08, 82.09; 435/968, 808

[56] References Cited

U.S. PATENT DOCUMENTS 3,670,202  6/1972  Paine et al. ................ 315/297
5,401,465  3/1995  Smethers et al. ............ 422/52

Primary Examiner—Frank G. Font
Assistant Examiner—Michael P. Stafira
Attorney, Agent, or Firm—Donald C. Casey

[57] ABSTRACT

A calibration system for a measuring device utilizing a photo multiplier tube is provided. The calibration system is intended to provide a stable light source variable over a wide range of intensities which can be used to calibrate the PMT reading using a closed loop feedback circuit. The LED and a photo cell are disposed in a reference block chamber whereby the photo cell is in close proximity disposed perpendicular to the axis of the LED. The LED being dome shaped will direct light energy on to the photo cell, and also peripherally. The PMT is disposed adjacent the LED and at an angle to its longitudinal axis whereby light generated by the PMT simultaneously strikes both the photo cell and the PMT without reflection.

8 Claims, 3 Drawing Sheets

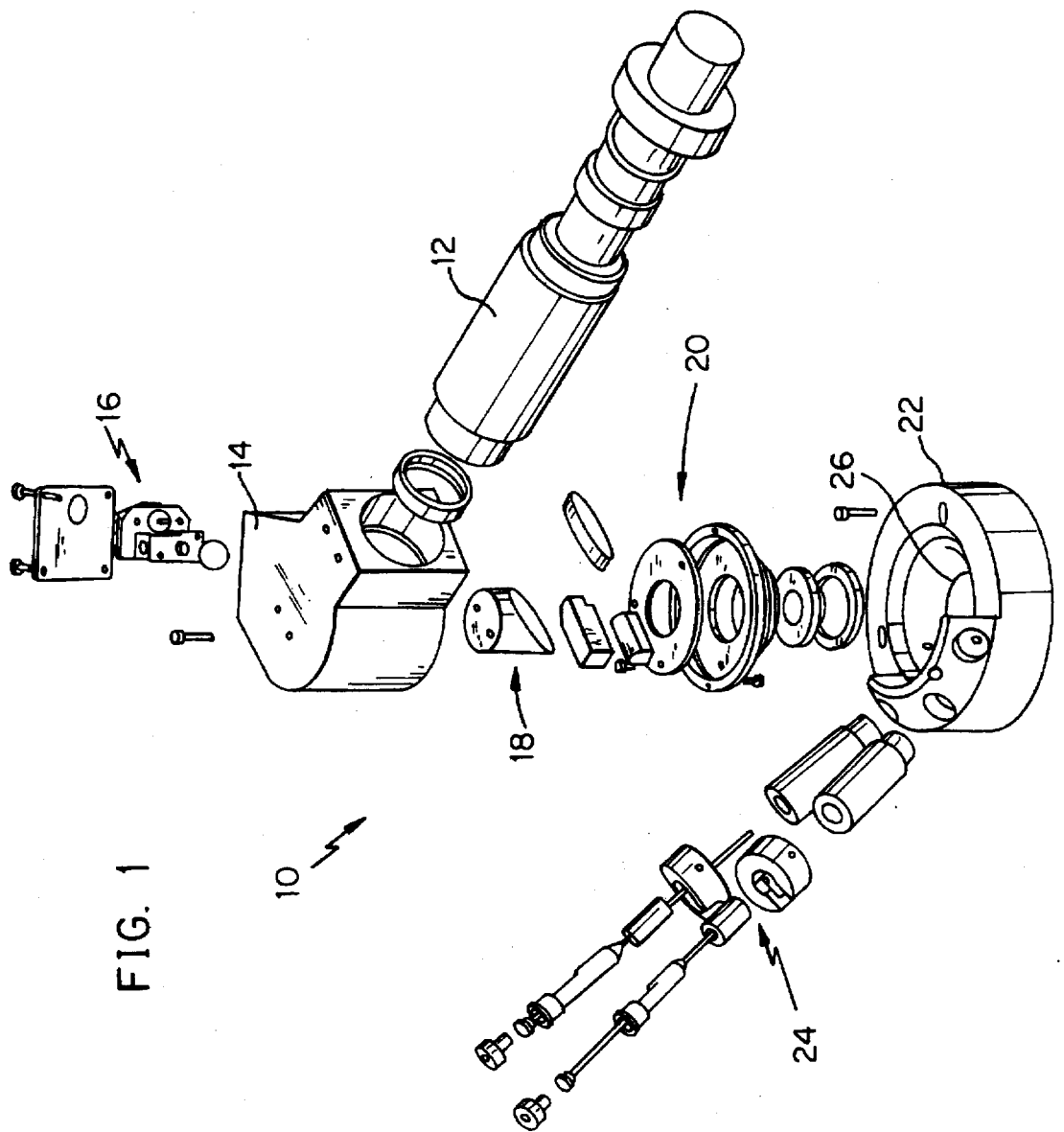

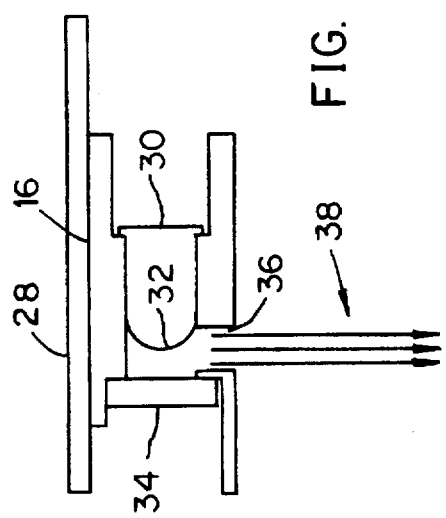
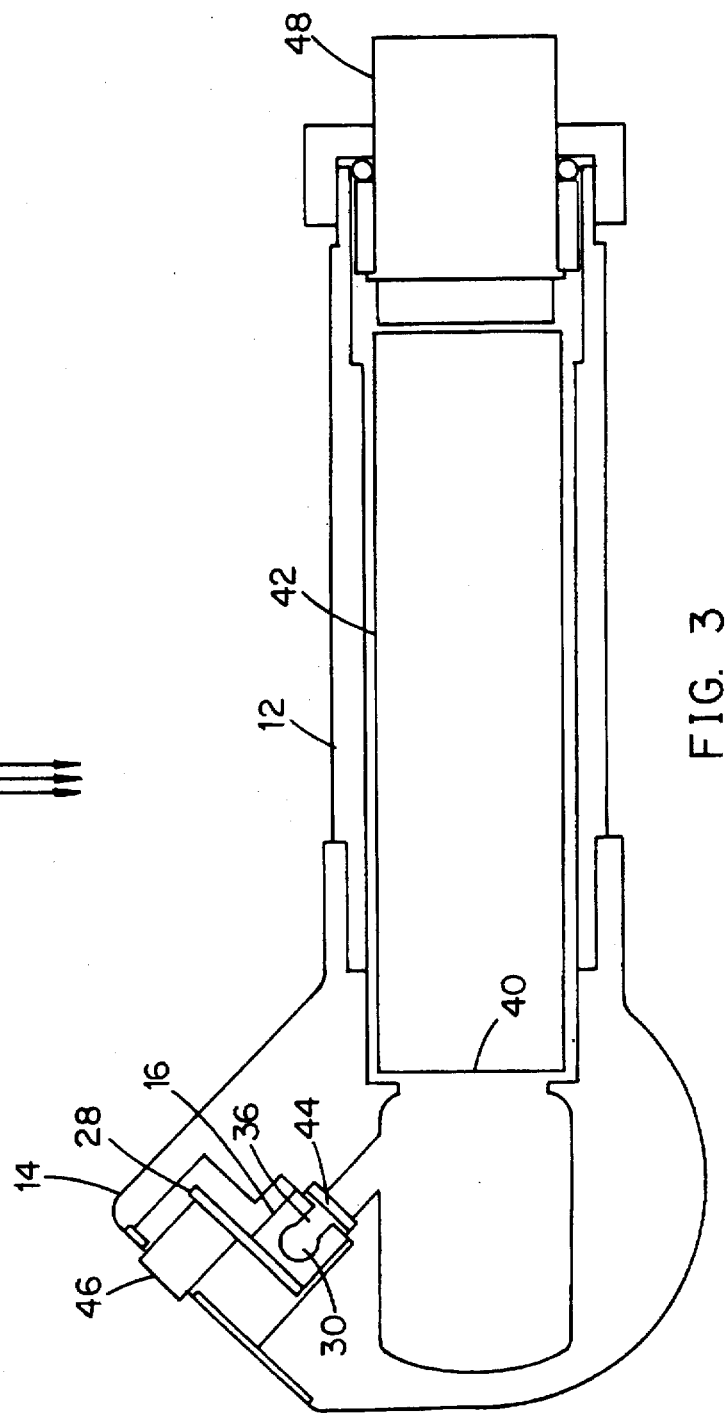

5,715,048

CALIBRATION SYSTEM FOR A PHOTO MULTIPLIER TUBE

TECHNICAL FIELD

This invention relates to a calibration system and, in particular, to a device for calibrating a photo multiplier tube (PMT) useful in measuring the intensity in light, for example, in fluorometric or a luminescent analysis.

BACKGROUND ART

Laboratory analyses of a wide variety of different materials including biological fluids often depend upon the measurement of the intensity of a light beam. In fluorometric analysis, the sample, in a titration cell, is treated with reagents and a light is passed through the cell whereupon the intensity of the beam passing through is measured. Principally, there are two types of optical systems utilized in fluorometric analysis. In a frontal approach optical system the light beam is shown downwardly into the cell and the light simultaneously reflected upwardly, through the open cell top, is measured. In the alternative, the light beam passes through the cell and through a window in the bottom of the cell whereupon the intensity of the beam is measured. In both systems various errors are inherent. For example, in the frontal approach system, the beam is directed downwardly, and the reflection directed upwardly, both through the small open cell top. It is difficult then to isolate the reflectance for analysis. In the latter case, the window itself through which the descending beam passes may fluoresce and add a native fluorescence or noise error to the reading.

A luminescent analysis eliminates errors inherent in a fluorometric system, and is much more accurate. In a luminescence analysis, the sample, in a titration cell, reacts either chemically or biologically to generate visible light. The reaction occurs typically shortly after reagents are added to a sample contained in a cell, and not simultaneously. In a luminescent reaction, typically light is directed upwardly through the open top of the cell where it is columnated, and directed to a photo multiplier tube wherein the intensity of the reading is measured electrically. The intensity then is proportional to a characteristic of the sample tested.

The cells used in both luminescent and fluorescent analysis may be single cells or strips, but typically are plates of microtitration cells with each plate containing eight rows of twelve cells. Such plates are sold under the trademark MICTOTITER by Dynatech Laboratories, Inc., Assignee of this invention. Such plates can be pigmented and often are black to reduce cross talk between adjacent cells or white to increase the reflected signal from within the cell.

A PMT used to analyze light signals, however, requires continual calibration. A PMT is relatively unstable and will require frequent calibration even under the most exact laboratory conditions during repeated usage.

U.S. Pat. No. 5,401,465 described a luminometer used to analyze well strips and in particular to evaluate the luminescent reaction through the circular window or aperture in the top of an individual well with a photodetector head. While the photodetector head itself is not specifically described, the device does include two embodiments of a calibration unit therefor. In the first embodiment, a calibration light emitting-diode (LED) is fitted in the wall of a housing opposite a photo diode in a chamber defined within the housing. The intensity of the light emitted by the LED then is directly measured by the photo diode. The light from the LED, however, is scattered within the chamber and the chamber itself then provides a source of reflected light of constant intensity. The housing includes an upper opening wherein the photo detector head can take a reading. Undescribed circuitry is provided to insure that a constant source of light is provided within the cavity. The photo detector head is then adjusted to read the correct intensity based upon the reading of reflected light within the cavity.

In a second embodiment, a plurality of different light intensities are provided using the same type of structure but with different sized apertures. The different sized apertures then are intended to provide different intensities at each aperture so that a curve of the response from the photo detector head can be provided.

This then essentially is a mechanical structure for calibration which can prove to be time consuming, and is subject to error in that the photo detector head calibration is limited to a small number of different intensity readings, such as four, and it is then necessary to evaluate the response and adjust the instrument based on these readings only.

DISCLOSURE OF THE INVENTION

It has been discovered, however, that a calibration system for a photo multiplier tube (PMT) can be provided in a compact physical structure with a feedback circuit for repeated calibrations over a wide range of intensities so that such a measuring device can be repeatedly recalibrated during use without substantial down time, for increased accuracy and efficiency.

The PMT calibration device of this invention uses a light emitting diode (LED) which is disposed axially away from a photo cell in a block and this unit is mounted adjacent the PMT. Light from the LED then is directed axially onto the photo cell for an accurate reading thereof, and also peripherally directly onto the surface of the PMT. The PMT then does not measure reflected light but rather directly measures the intensity of the beam generated by the dome-shaped LED. This reading then is proportional to the signal generated by the photo cell. A feedback circuit is provided and the intensity of the LED is controlled so that any desired number of calibrating intensities can be generated by the LED, and read by the photocell and PMT for calibration purposes. Furthermore, the calibration is then automatically achieved by the circuitry involved.

Accordingly, it is an object of this invention to provide a compact calibrating unit for a PMT which can directly evaluate the response thereof to a wide variety of different intensity levels generated by a light emitting diode.

It is another object of this invention to provide a photo detector calibration device for a luminometer which will not interfere with optical readings with the luminometer, but which can be used to directly generate a signal onto the PMT thereof for calibration purposes.

It is still another object of this invention to provide a PMT calibrating device with an electronic feedback circuitry so that desired light intensities from an LED can be directly read by both a photo cell and the PMT, and the signals evaluated for calibration purposes quickly and efficiently by self-contained electronic circuitry.

BRIEF DESCRIPTION OF THE DRAWINGS

These and other objects will become readily apparent with reference to the drawings and following description wherein:

FIG. 1 is an exploded view of a typical luminometer optical system using the calibration system of this invention.

FIG. 2 is a schematic view of the reference block containing the LED and photo cell for the calibrating device of this invention.

FIG. 3 is a schematic plan view of the optical system of the device of FIG. 1 illustrating the structural relationship between the calibration device of this invention and the face of the photo multiplier tube.

BEST MODE FOR CARRYING OUT THE INVENTION

Figure 4:
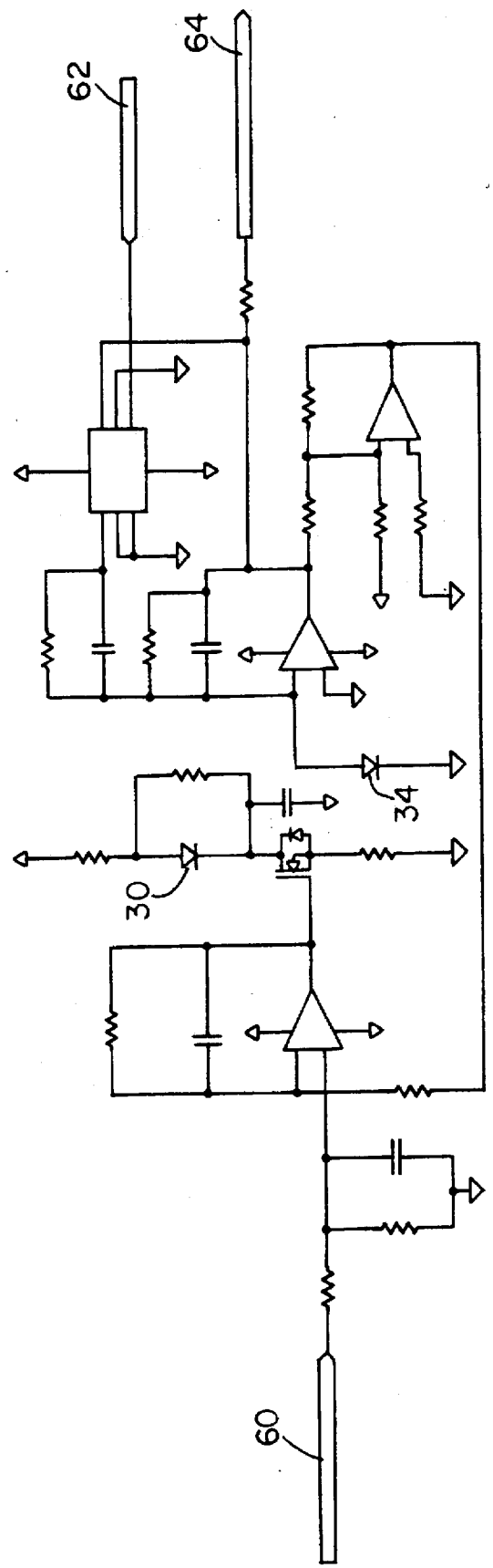
FIG. 4 is a circuit diagram of a typical feedback circuit for in the calibration system of this invention.

Attention is directed to the drawings and to FIG. 1 in particular, where there is shown an exploded view of the optical system for a luminometer. This invention is not intended to be limited to luminometers or to this particular structure as will be obvious to those skilled in the art but it is intended to be used in any measurement system especially utilizing a photo multiplier tube (PMT).

In FIG. 1, the optical system 10 includes a photo multiplier tube housing 12 which fits into a PMT block 14. Block 14 also mounts a reference block 16 which contains the LED and photo cell as will be subsequently described, and a mirror 18. The block 14 then is intended to house the mirror 18 and a lens mounting collar 20 attaches the block 14 and associated structure to a dispenser 22. Dispenser 22 is intended to mount a plurality of injectors 24 for injecting reagents into test cells (not shown). The typical microtitration cells are disposed below the dispenser 22 so that the luminescent reaction will involve light reflected upwardly through aperture 26 to mirror 18 and a columnating lens (not shown) will be provided in collar 20 so that the mirror 18 can reflect the light from aperture 26 directly onto the face of the PMT enclosed in housing 12.

With attention to FIG. 2, reference block 16 mounts a circuit board 28 and internally mounts an LED 30 which has a dome 32. The photo cell 34 is disposed directly, axially in front of the LED 30 and is typically about one mm away from the dome 32. Light from the LED then directly strikes the face of the photo cell 34. Because of the dome 32, however, light is also directed laterally through aperture 36 in the direction 38 so that it impacts on the face 40 of the photo multiplier tube 42, as shown in FIG. 3.

The PMT 42 then disposed within housing 12 has a face 40 which is in alignment with aperture 36 whereby light from the LED 30 passes through aperture 36, a filter 44, and then directly strikes the face 40 of PMT 42. The reference block 16 then is affixed in the PMT block 14 and an electrical socket 46 is coupled to the circuit board 28 which in turn controls the intensity of the light from LED 30 and the intensity reading from the photo cell 34. Similarly, a socket 48 is provided on the PMT 42 which is used to connect this photo detector to the associated electronic circuit.

With attention to FIG. 4, there is shown therein a circuit diagram intended to provide a stable and variable light reference over a wide range and a relative measurement of that light intensity. For example, typically the circuit herein will provide an LED reference over a range of from 0.1 RLU to 10,000 RLU. The input 60 is from a microprocessor and for example, could be from 0 to 5 volts. The dynamic range is altered by the gain input 62 which could be over a range of from 1000 to 1. The voltage output 64 measuring the light intensity of the LED is used to generate a calibration factor in associated software (not shown). The calibration factor generated then is used to modify the readings of the PMT 42.

As is known in the art, the photo cell 34 and diode 30 provide a stable light source, whereas the PMT 42 tends to waver. It is necessary then to periodically calibrate the system to correct the PMT readings of light intensity from the test cell. The device of this invention then provides that calibration over a very wide range and recalculates the calibration factor periodically using internal software. A closed loop control of the PMT gain is then provided by comparison to the calibration LED selected intensity value.

The calibration factor referred to above is the gain factor times the photo cell reading divided by the PMT RLU value. The true RLU value equals the raw PMT reading times the calibration factor. The gain factor referred to above is a value that is established upon factory calibration and is stored in non-volatile memory and not modified during normal operation. The gain factor specifically is a true well value divided by a PMT well reading times the PMT LED reading divided by the photo cell LED reading.

In summary then, the device of this invention is intended to calibrate a PMT or similar device by providing a reference signal which can be varied in intensity over a wide range and uses a closed loop feedback to provide a calibration factor which is then used by software to modify the raw PMT reading. The device of this invention provides both a stable light source reference for calibration, and a reference that is variable over a very wide range of intensities. The structure of the calibration device utilizes a reference block wherein the photo cell is disposed axially in close proximity to the LED, whereas the light from the LED strikes the PMT without reflection. Because the LED is dome shaped, the light therefrom can simultaneously strike both the stable photo cell reference and the relatively unstable PMT, whereby the photo cell intensity can be used to calibrate the PMT intensity reading against a known reference.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A calibration system for a photomultiplier tube comprising:

a reference block having a chamber therein; an elongated light emitting diode having a dome shaped end said end extending into said chamber; a photocell mounted in the chamber adjacent said dome, substantially perpendicular to the longitudinal axis of said diode;

a photomultiplier tube having a light sensitive face coupled to said block said light sensitive face being contained in a plane disposed at an acute angle to said longitudinal axis, said block defining a light transmitting channel disposed at an angle to the axis of said diode and extending from said dome to the face of said tube whereby light from said diode simultaneously strikes said photocell and light sensitive face of said tube without reflection; and circuit means coupled to said photocell and diode and to said photomultiplier tube for calibrating the light intensity reading of said tube with the intensity reading of said photocell responsive to light from said diode.

2. The system of claim 1 wherein said circuit means further comprises means for varying the intensity of light from said diode.

3. The system of claim 2 wherein said circuit means includes means for varying intensity over a range of from 0.1 RLU to 10,000 RLU.

4. In a luminometer having an optical system including an upwardly opening aperture over a test cell, a columnating lens over said aperture for colunmating light passing upwardly therethrough, a photomultiplier tube having a light sensitive face parallel to the column of light from said lens and a mirror means between said lens and tube for directing said column of light onto said face, the improvement comprising:

calibration means including a photocell and dome shaped light emitting diode on an elongated base, said photocell being disposed perpendicular to the longitudinal axis of said base, and circuit means coupled thereto and to said photomultiplier tube for directing light at a predetermined intensity simultaneously onto said photocell and the face of said tube without reflection said light sensitive face being contained in a plane disposed at an acute angle to said longitudinal axis and for calibrating said tube by comparing the intensity thereof as read by said photocell and tube, said means further comprising circuit means for varying the intensity of the light from said diode in predetermined quantities.

5. The luminometer of claim 4 wherein said circuit means for varying intensity includes means for varying the intensity over a range of from 0.1 RLU to 10,000 RLU.

6. The luminometer of claim 4 wherein the center of said photocell, the center of said light sensitive face and the longitudinal axis of said diode lie in a common horizontal plane.

7. The luminometer of claim 4 further comprising a hollow block mounting said diode and photocell therein, said block having an aperture whereby the light sensitive face of said tube receives light from said diode through the aperture.

8. The luminometer of claim 4 wherein said circuit means includes a closed loop feedback circuit between said diode and photocell.

\* \* \* \* \*

UNITED STATES PATENT AND TRADEMARK OFFICE
CERTIFICATE OF CORRECTION

PATENT NO. : 5,715,048
DATED : February 3, 1998
INVENTOR(S) : Walter W. Taylor

It is certified that error appears in the above-identified patent and that said Letters Patent is hereby corrected as shown below:

On the title page, item [57]
ABSTRACT, last sentance of the Abstract after the words "light generated by the" change the phrase "PMT" to --LED--.

Signed and Sealed this

Fifth Day of May, 1998

*Attest:*

BRUCE LEHMAN

*Attesting Officer*     Commissioner of Patents and Trademarks